April 8, 1969

R. I. HOMIER 3,437,302

WEDGE BLOCK SEAT ADJUSTER WITH MOTION TRANSMITTING RODS

Filed Feb. 23, 1966

INVENTOR.
Robert I. Homier
BY
ATTORNEYS

United States Patent Office 3,437,302
Patented Apr. 8, 1969

3,437,302
WEDGE BLOCK SEAT ADJUSTER WITH MOTION TRANSMITTING RODS
Robert I. Homier, Farmington, Mich., assignor, by mesne assignments, to Lear Siegler, Inc., Santa Monica, Calif., a corporation of Delaware
Filed Feb. 23, 1966, Ser. No. 529,312
Int. Cl. F16m 11/04, 11/06, 11/12
U.S. Cl. 248—394                                26 Claims

ABSTRACT OF THE DISCLOSURE

A seat assembly including an adjustment mechanism comprising first and second like and parallel members slidably supported by a support member with a first lever pivotally connected to the first members and a pair of wedge blocks coacting between the first members and the levers for pivoting the levers relative to the members and including a motion transmitting torque bar threadedly engaging and operatively interconnecting the two wedge blocks for moving the wedge blocks in unison.

---

Figure 1:
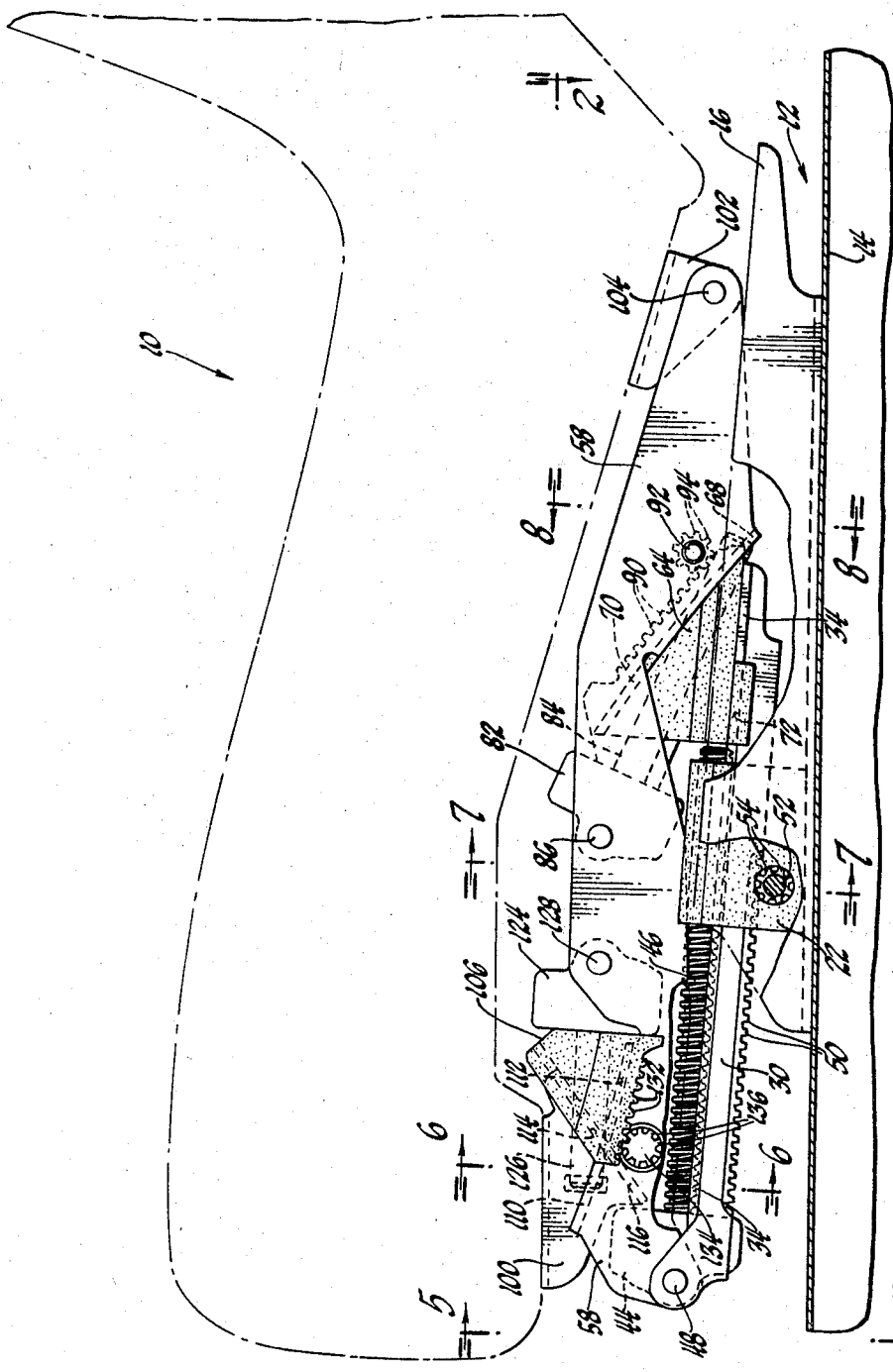

Assemblies of the type heretofore utilized for adjusting the position of a seat normally comprise complex mechanisms utilizing jacks and/or various other complex components. Two fundamental problems are associated with the prior art assemblies; to wit, they are expensive to fabricate, and they utilize an excessive amount of vertical space. Those concerned with developing new seat adjusting assemblies are constantly striving to invent an assembly which is inexpensive to fabricate and which utilizes a very minimum of vertical space.

Normally, the assemblies heretofore utilized to position the seat employ like and parallel units disposed adjacent each side of the seat such that each of the units is driven by similar drive means. Usually this involves a motor which drives a gear box, or the like, for each respective unit on each side of the seat. These gear boxes increase the cost of the assembly, and frequently six or more gear box assemblies or like components, are necessarily utilized in a seat adjusting assembly.

Accordingly, it is an object and feature of the present invention to provide a seat adjusting assembly having a parallel and like unit for each side of the seat but wherein only one gear box is necessitated for driving both parallel units in unison in one mode of movement.

Another object and feature of this invention is to provide a seat adjusting assembly which utilizes a minimum of components to reduce the complexity and the expense thereof while at the same time utilizes a minimum of vertical space.

In general, these and other objects and features of this invention may be attained by an assembly including a pair of slider members slidably disposed on a support means, a pair of lever members each pivotally connected to one of the slider members, a mount means pivotally connected to the lever members, a pair of wedge blocks coacting with the slider members and lever members to pivot the lever members upon movement of the blocks, and a second pair of blocks coacting with the lever members and the mount means to pivot the mount means upon movement of the second pair of blocks. There is also included means for moving one of the slider members and for moving one of the first pair of blocks and for moving one of the second pair of blocks. A first torque means is included which has teeth at each end thereof for coacting with teeth on the respective slider members for moving the slider members in unison. A second torque means is included which also has gear teeth on each end thereof for engaging gear teeth on the respective first pair of blocks to move the first pair of blocks in unison. And a third torque means is included which has gear teeth on each end thereof to engage gear teeth on the respective second pair of blocks for moving the second pair of blocks in unison.

Figure 2:
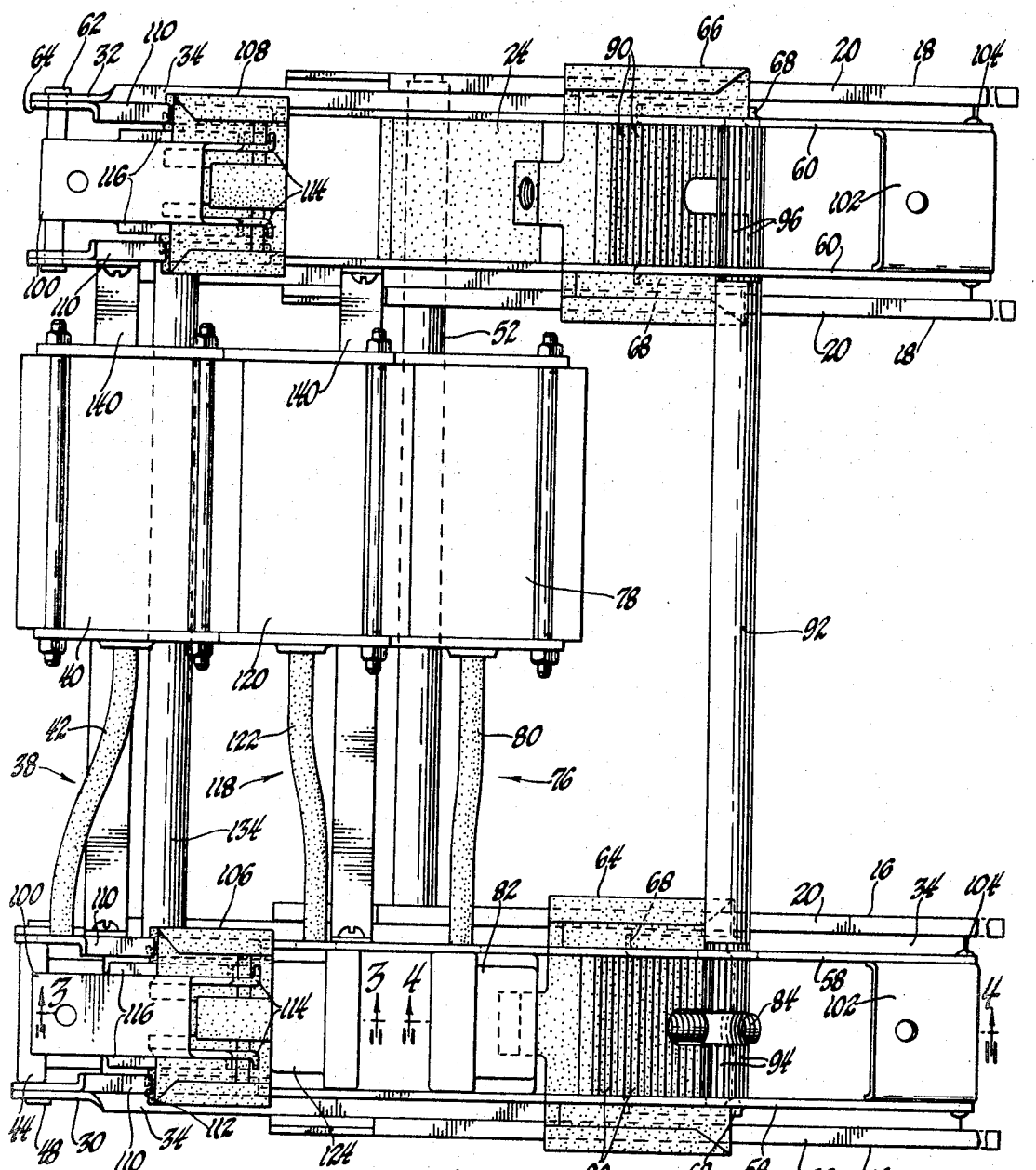
Figure 3:
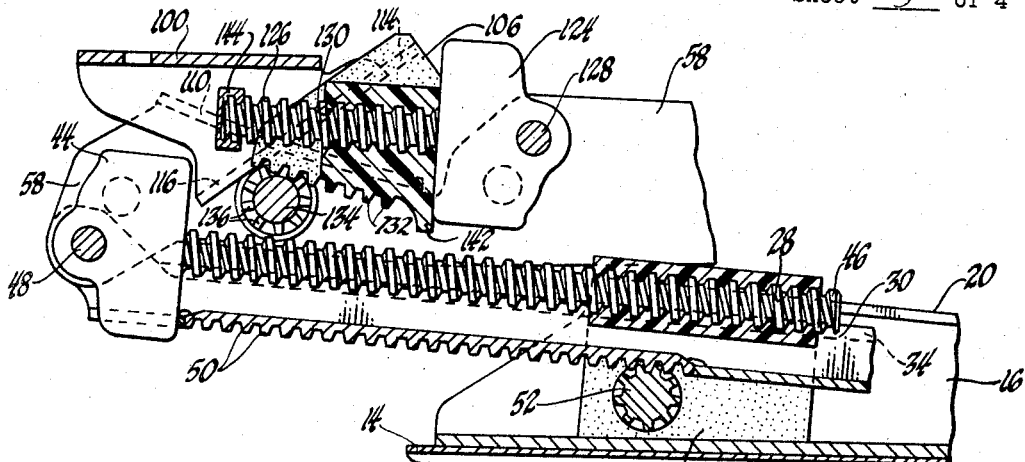
Figure 4:
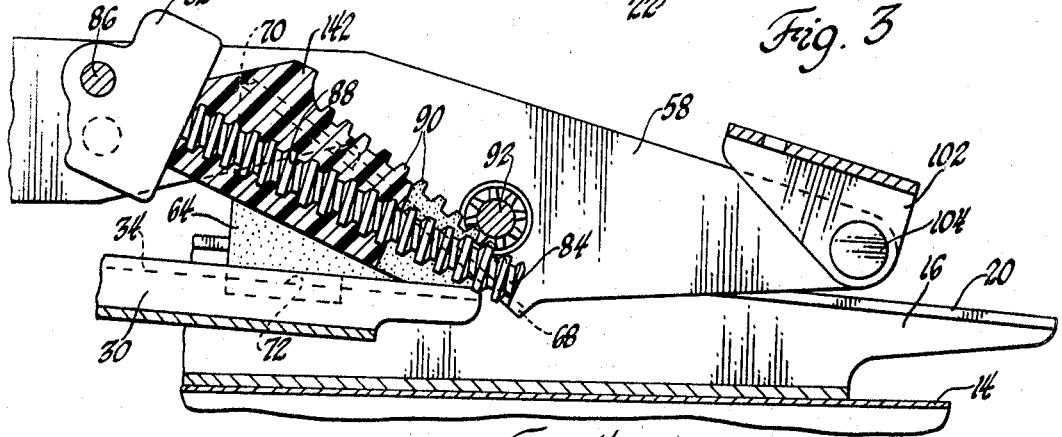
Figure 5:
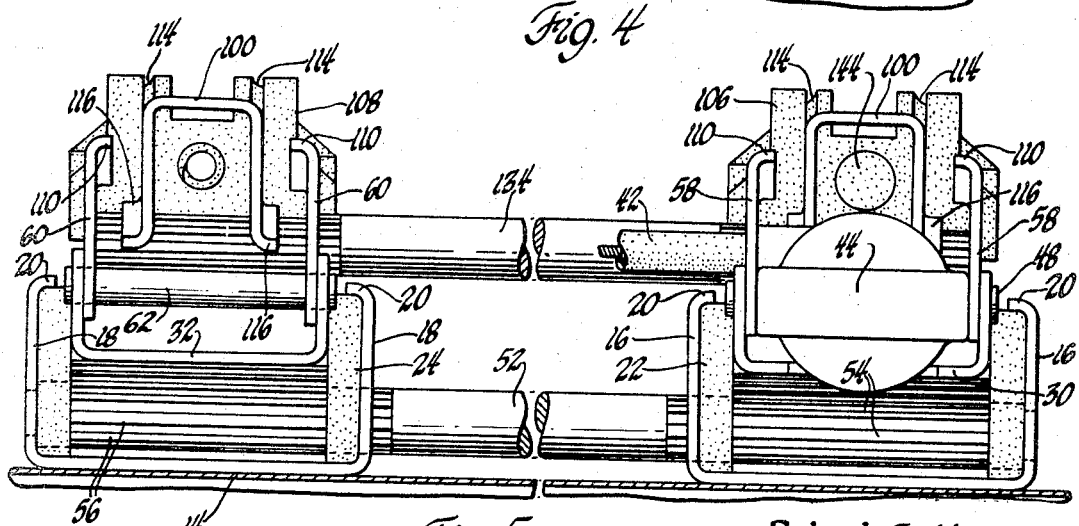
Figure 6:
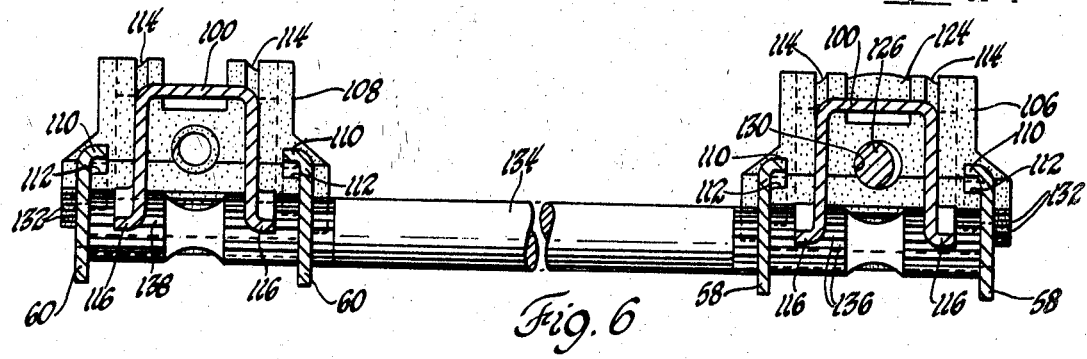
Figure 7:
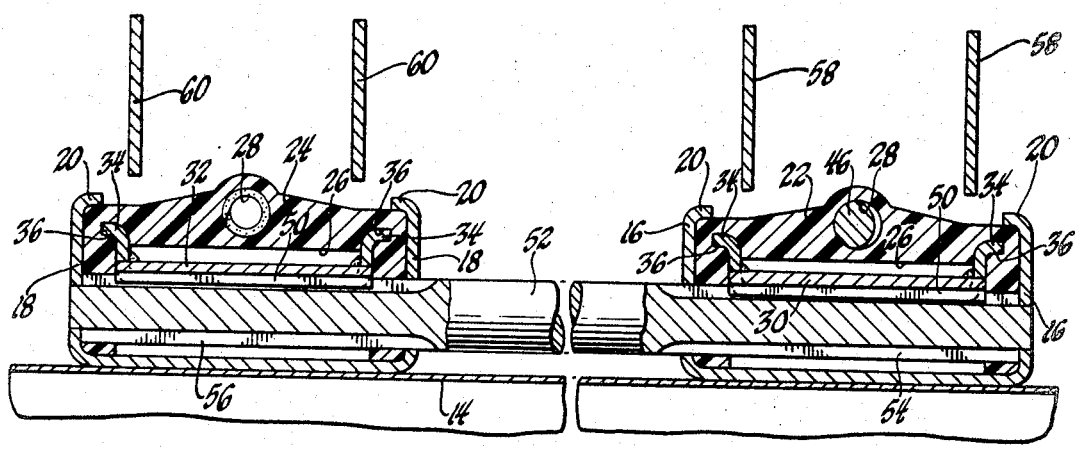
Figure 8:
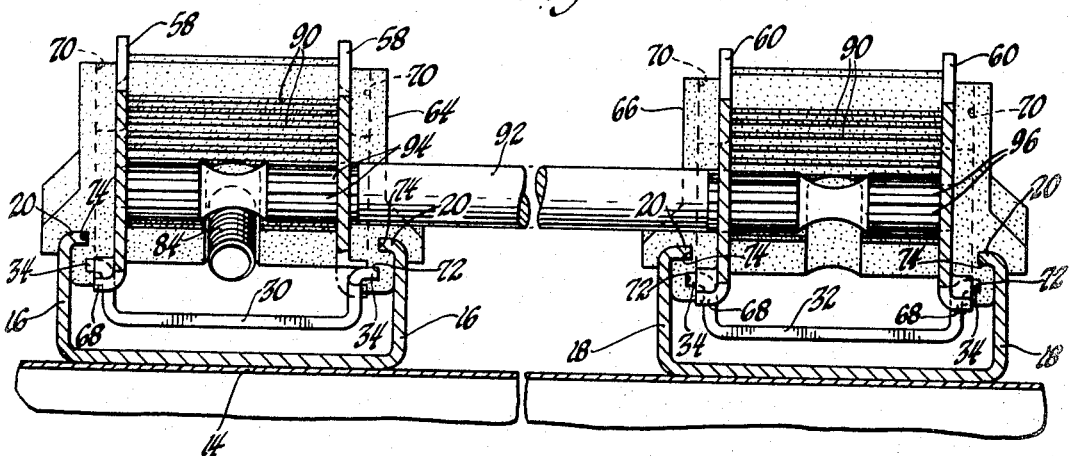

Other objects and attendant advantages of the present invention will be readily appreciated as the same becomes better understood by reference to the following detailed description when considered in connection with the accompanying drawings wherein:

FIGURE 1 is a side elevational view partly broken away of a preferred embodiment of the instant invention;
FIGURE 2 is a plan view taken substantially along line 2—2 of FIGURE 1;
FIGURE 3 is an enlarged fragmentary cross-sectional view taken substantially along line 3—3 of FIGURE 2;
FIGURE 4 is an enlarged fragmentary view taken substantially along line 4—4 of FIGURE 2;
FIGURE 5 is an enlarged end view taken substantially along line 5—5 of FIGURE 1;
FIGURE 6 is an enlarged cross-sectional view partially broken away and taken substantially along line 6—6 of FIGURE 1;
FIGURE 7 is an enlarged cross-sectional view taken substantially along line 7—7 of FIGURE 1; and
FIGURE 8 is an enlarged cross-sectional view taken substantially along line 8—8 of FIGURE 1.

Referring now to the drawings, wherein like numerals indicate like or corresponding parts throughout the several views, a seat adjusting assembly constructed in accordance with the instant invention is generally shown at 10.

A support means is generally shown at 12 and rests upon the structure 14 which is normally the floor of an automobile, or the like. The support means 12 includes the first and second support members 16 and 18. The support members 16 and 18 have a substantially U-shaped cross section with a pair of flanges 20 extending from the legs thereof. Stationary blocks 22 and 24 are secured to the respective support members 16 and 18 and each of the stationary blocks 22 and 24 has a cavity 26 therein and a threaded bore 28 extending therethrough.

First and second slider members 30 and 32 are each slidably disposed on the support means 12. That is to say, each of the slider members 30 and 32 is slidably disposed in the cavity 26 of one of the stationary blocks 22 and 24 by a pair of flanegs 34 which extend from each of the slider members 30 and 32 and are slidably disposed in a pair of grooves 36 in the respective stationary blocks 22 and 24.

A first drive means, generally shown at 38, moves the first slider member 30 relative to the first support member 16. The first drive means 38 includes the motor 40, the cable 42, the first gear box 44, and the first threaded shaft 46. The motor 40 is connected by the motion transmitting cable 42 to the first gear box 44. The first gear box 44 is connected to the first slider member 30 by the pin 48 and the first threaded shaft 46 extends from the first gear box 44 and threadedly engages the threaded bore 28 in the stationary block 22. As the motor 40 is operated, the first gear box 44 amplifies the torque and reduces the speed so that the threaded shaft 46 rotates much slower than the motor 40, whereby, upon rotation of the threaded shaft 46, the slider member 30 slides through the stationary block 22.

A first motion transmitting means operatively interconnects the first slider member 30 and the second slider member 32 for moving the second slider member 32 in unison with the first slider member 30. The first motion transmitting means includes gear teeth 50 disposed along the bottom of each of the slider members 30 and 32 and a first torque means comprising the straight bar 52 with gear teeth 54 circumferentially disposed about one end thereof to form a first gear engaging the gear teeth 50 on the first slider member 30 and gear teeth 56 circumferentially disposed about the other end to form a second gear engaging the gear teeth 50 on the second slider member 32. The first bar 52 has one end rotatably disposed in the stationary block 20 to pass through the cavity 26 thereof and the other end rotatably disposed in the other stationary block 24 to pass through the cavity 26 thereof, whereby the first bar 52 rotates upon movement of the first slider member 30 to move the second slider member 32. The slider members 30 and 32 are, therefore, moved in unison by the motor 40 and a single gear box 44 through the bar 52 to adjust the fore and aft position of the seat.

The assembly 10 also includes an adjustment means operatively connected to the first and second slider members 30 and 32 and adapted for supporting and adjusting the vertical position of the seat.

More specifically, a first lever member 58 is pivotally connected adjacent a first end thereof through the pin 48 to the first slider member 30. A second lever member 60 is pivotally connected adjacent a first end thereof through the pin 62 to the second slider member 32. A first wedge block 64 is disposed for sliding movement along the first slider member 30 and along the first lever member 58 for pivoting the first lever member 58 relative to the slider member 30. A second wedge block 66 is disposed for sliding movement along the second slider member 32 and along the second lever member 60 for pivoting the second lever member 60 relative to the second slider member 32.

A first pair of flanges 68 extend from each of the lever members 58 and 60. Each pair of flanges 68 is slidably disposed in a first pair of grooves 70 in each of the respective wedge blocks 64 and 66. The flanges 68 and the grooves 70 form a first plurality of relatively slidable coacting surfaces disposed between each of the lever members 58 and 60 and the respective wedge blocks 64 and 66. Each pair of flanges 34 of the slider members 30 and 32 is disposed in a second pair of grooves 72 in each of the wedge blocks 64 and 66. The flanges 34 and grooves 72 form a second plurality of relatively slidable coacting surfaces disposed between the wedge blocks 64 and 66 and the respective slider members 30 and 32. The first plurality of coacting surfaces formed by the flanges 68 and the grooves 70 are disposed at an acute angle with the second plurality of coacting surfaces formed by the flanges 34 and the grooves 72 whereby the lever members 58 and 60 pivot upon movement of the wedge blocks 64 and 65. In addition, the first plurality of coacting surfaces formed by the flanges 68 and the grooves 70 are parallel and arcuate for maintaining total sliding contact between the coacting surfaces along the entire overlapping length thereof as the respective wedge blocks 64 and 66 are moved. That is to say, the surfaces of the lever members 58 and 60 would not remain in total sliding contact with the surfaces of the wedge blocks 64 and 66 as the wedge blocks move if the flanges 68 and grooves 70 were straight because the lever members 58 and 60 pivot upwardly and the angle between the flanges 70 and a horizontal plane changes as the respective lever members pivot. Thus, by arcuately curving the flanges 68 and grooves 70 to a predetermined degree, which depends upon the geometrical relationship of the components, total sliding contact is maintained over the entire overlapping length of the flanges 68 and grooves 70 as the wedge blocks 64 and 66 move.

The first and second wedge blocks 64 and 66 are also disposed in sliding engagement with the first and second support members 16 and 18. The flanges 20 of each of the support members 16 and 18 are slidably disposed in a third pair of grooves 74 in each of the respective wedge blocks 64 and 66. The flanges 20 and the grooves 74 are substantially parallel to the flanges 34 and the grooves 72 and, as the slider members 30 and 32 are moved relative to the support members 16 and 18, the respective wedge blocks 64 and 66 slide along with the respective slider members 30 and 32. But as the lever members 58 and 60 are pivoted as the wedge blocks 64 and 66 slide relative to the support members 16 and 18 and relative to the slider members 30 and 32.

There is also included a second drive means, generally shown at 76, for moving one of the first and second wedge blocks 64 and 66. The drive means 76 includes a second motor 78, a motion transmitting cable 80, a second gear box 82, and a second threaded shaft 84. The second gear box 82 is pivotally connected to the lever member 58 by the pin 86. The second threaded shaft 84 extends from the gear box 82 and threadedly engages a threaded bore 88 in the wedge block 64.

A second motion transmitting means operatively interconnects the first wedge block 64 and the second wedge block 66 for moving the first and second wedge blocks in unison. The second motion transmitting means includes the gear teeth 90 disposed on the first and second wedge blocks 64 and 66, and the second torque means comprising the second straight bar 92. The gear teeth 90 are disposed along lines which are parallel to the arcuate surfaces formed by the flanges 68 and grooves 70 so that as the respective wedge blocks 64 and 66 move, the gear teeth 90 will maintain the same relative position with respect to the bar 92 at the point of contact therebetween. The second straight bar 92 has gear teeth 94 disposed circumferentially thereabout at one end to form a gear engaging the gear teeth 90 on the first wedge block 64. The bar 92 also has gear teeth 96 disposed circumferentially about the other end thereof to form a gear engaging the gear teeth 90 on the second wedge block 66. One end of the bar 92 is rotatably disposed in the lever member 58 and the other end is rotatably disposed in the lever member 60 so that as the bar 92 rotates it moves the second wedge block 66 in unison with the first wedge block 64 as the first wedge block 64 is moved by the second drive means 76.

The adjusting means also includes a mount means adapted for supporting the seat, which mount means is pivotally connected to the lever members 58 and 60 adjacent the second ends thereof. More specifically, the mount means comprises a pair of brackets 100 and a pair of brackets 102. The brackets 100 and 102 have holes therein so that fastening means may be disposed therethrough to secure a seat to the brackets. It is to be understood, however, that the brackets 100 and 102 may take the form of a unitary member or may form a part of the seat. The brackets 102 are pivotally secured to the respective lever members 58 and 60 by the pins 104, hence, the mount means is pivotally connected to the lever members 58 and 60.

A third wedge block 106 is disposed for sliding movement along the first lever member 58 and along one of the brackets 100 of the mount means. A fourth wedge block 108 is disposed for sliding movement along the second lever member 60 and along the other bracket 100 of the mount means. The mount means, therefore, pivots relative to the lever members 58 and 60 upon movement of the third and fourth wedge blocks 106 and 108.

A second pair of flanges 110 extend from each of the lever members 58 and 60 and each pair of flanges 110 is slidably disposed in a first pair of grooves 112 in each of the third and fourth wedge blocks 106 and 108. The flanges 110 and grooves 112 form a third plurality of relatively slidable coacting surfaces disposed between each lever member and one of the third and fourth wedge blocks 106 and 108. The third and fourth wedge blocks 106 and 108 each have a second pair of grooves 114 therein and a pair of flanges 116 extends from each bracket 100 of the mount means so that each pair of flanges 116 is slidably disposed in one of the second pair of grooves 114. The flanges 116 and the grooves 114 form a fourth plurality of relatively slidable coacting surfaces disposed between each of the third and fourth wedge blocks 106 and 108 and the brackets 100 of the mount means. The third plurality of coacting surfaces formed by the flanges 110 and grooves 112 are disposed at an acute angle with the fourth plurality of coacting surfaces formed by the grooves 114 and the flanges 116 whereby the interconnected brackets 100 and 102 pivot when the third and fourth wedge blocks 106 and 108 are moved. The flanges 110 and grooves 112 are also parallel and arcuate for maintaining total sliding contact between the third and fourth plurality of coacting surfaces respectively along the entire overlapping length thereof as the third and fourth wedge blocks 106 and 108 are moved. The flanges 110 and grooves 112 are arcuately curved for the same reason that flanges 68 and grooves 70 are arcuate, as set forth hereinbefore.

A third drive means, generally shown at 118, moves the third and fourth wedge blocks 106 and 108. The third drive means 118 includes the third motor 120, the motion transmitting cable 122, the third gear box 124, and the third threaded shaft 126. The third gear box 124 is pivotally connected by the pin 128 to the lever member 58. The third threaded shaft 126 extends from the third gear box 124 and threadedly engages a threaded bore 130 in the third wedge block 106.

A third motion transmitting means operatively interconnects the third wedge block 106 and the fourth wedge block 108 for moving the third and fourth wedge blocks in unison. The third motion transmitting means includes the gear teeth 132 disposed on the third and fourth wedge blocks 106 and 108, and the third torque means comprising the third straight bar 134. The gear teeth 132 are disposed along lines which are parallel to the arcuate surfaces formed by the flanges 110 and grooves 112 so that the gear teeth 132 on the third and fourth wedge blocks 106 and 108 are always in the same position relative to the bar 134 at the point of contact therewith. The bar 134 has gear teeth 136 disposed circumferentially about one end thereof to form a gear engaging the gear teeth 132 on the third wedge block 106. The bar 134 also has gear teeth 138 disposed circumferentially about the other end for forming a gear engaging the gear teeth 132 on the fourth wedge block 108. The bar 134 is rotatably disposed at one end thereof in the lever member 58 and is rotatably disposed at the other end thereof in the lever member 60. The third bar 134, therefore, rotates to move the fourth wedge block 108 in response to movement of the other wedge block 106 by the third drive means 118.

The braces 140 interconnect the lever members 58 and 60 and support the motors 40, 78 and 120. It is to be understood, of course, that various other motor means may be utilized to drive the respective gear boxes.

The abutments 142 on the various wedge blocks are utilized as stops to limit the movement of the wedge blocks in one direction and the movement of the wedge blocks in the other direction is limited as the wedge blocks abut the various gear boxes. Alternatively, caps 144 may be disposed on the ends of the threaded shafts to act as stops.

This invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A seat adjusting assembly comprising; first and second members, a first lever member pivotally connected adjacent a first end thereof to said first member, a second lever pivotally connected adjacent a first end thereof to said second member, a first wedge block disposed for sliding movement along said first member and along said first lever member for pivoting said first lever member relative to said first member, a second wedge block disposed for sliding movement along said second member and along said second lever member for pivoting said second lever member relative to said second member, drive means operatively connected to one of said first and second wedge blocks for moving one of said wedge blocks, and motion transmitting means independent of said drive means and operatively interconnecting said first and second wedge blocks for moving one of said first and second wedge blocks in response to movement of the other whereby one of the front and rear portions of a seat may be raised and lowered by movement of said first and second wedge blocks in unison, said motion transmitting means and said wedge blocks being in operative engagement through gear teeth.

2. An assembly as set forth in claim 1 including support means, and wherein said first and second members are first and second slider members each slidably disposed on said support means, additional drive means operatively connected to said first slider member for moving the latter relative to said support means, additional motion transmitting means independent of said additional drive means and operatively interconnecting said first and second slider members for moving said second slider member in unison with said first slider member upon movement of said first slider member by said additional drive means, said additional drive means being a first drive means and said first mentioned drive means being a second drive means, said additional motion transimtting means being a first motion transmitting means and said first mentioned motion transmitting means being a second motion transmitting means.

3. An assembly as set forth in claim 2 wherein said second motion transmitting means includes gear teeth disposed on each of said first and second wedge blocks, and torque means having a first gear engaging the gear teeth on said first wedge block and a second gear engaging the gear teeth on said second wedge block.

4. An assembly as set forth in claim 3 wherein said torque means comprises a straight bar with gear teeth disposed circumferentially thereabout at each end thereof to form said first and second gears with one end of said bar rotatably disposed in one of said lever members and the other end rotatably disposed in the other of said lever members whereby said bar rotates to move one of said first and second wedge blocks in response to movement of the other by said second drive means.

5. An assembly as set forth in claim 4 including mount means adapted for supporting a seat and pivotally connected to said lever members adjacent the second ends thereof.

6. An assembly as set forth in claim 2 including mount means adapted for supporting a seat and pivotally connected to said lever members adjacent the second ends thereof.

7. An assembly as set forth in claim 6 including a third wedge block disposed for sliding movement along said first lever member and along said mount means, a fourth wedge block disposed for sliding movement along said second lever member and along said mount means, whereby said mount means pivots relative to said lever members upon movement of said third and fourth wedge blocks so that the other of said front and rear potrions of the seat may be raised and lowered by movement of said third and fourth wedge blocks, third drive means for moving one of said third and fourth wedge blocks, and third motion transmitting means operatively interconnecting said third and fourth wedge blocks for moving one of said third and fourth wedge blocks in response to movement of the other.

8. An assembly as set forth in claim 7 wherein said first motion transmitting means includes gear teeth disposed along each of said slider members, and first torque means having a first gear engaging the gear teeth on said first slider member and a second gear engaging the gear teeth on said second slider member.

9. An assembly as set forth in claim 8 wherein said second motion transmitting means includes gear teeth disposed on each of said first and second wedge blocks, and second torque means having a third gear engaging the gear teeth on said first wedge block and a fourth gear engaging the gear teeth on said second wedge block.

10. An assembly as set forth in claim 9 wherein said third motion transmiting means includes gear teeth disposed on each of said third and fourth wedge blocks, and third torque means having a fifth gear engaging the gear teeth on said third wedge block and a sixth gear engaging the gear teeth on said fourth wedge block.

11. An assembly as set forth in claim 10 including a first plurality of relatively slidable coacting surfaces disposed between said lever members and each of said first and second wedge blocks, and a second plurality of relatively slidable coacting surfaces disposed between each of said first and second blocks and said slider members, said first plurality of coacting surfaces being disposed at an actute angle with said second plurality of coacting surfaces whereby said lever members pivot upon movement of said first and second wedge blocks, one of said first and second plurality of coacting surfaces being parallel and arcuate for maintaining total sliding contact between said coacting surfaces along the entire overlapping length thereof as said first and second wedge blocks move.

12. An assembly as set forth in claim 11 wherein said gear teeth on said first and second wedge blocks are disposed along respective lines which are parallel to said arcuate coacting surfaces.

13. An assembly as set forth in claim 12 including a third plurality of relatively slidable coacting surfaces disposed between said lever members and each of said third and fourth wedge blocks, and a fourth plurality of relatively slidable coacting surfaces disposed between each of said third and fourth wedge blocks and said mount means, said third plurality of coacting surfaces being disposed at an acute angle with said fourth plurality of coacting surfaces whereby said mount means pivots upon movement of said third and fourth wedge blocks, one of said third and fourth plurality of coacting surfaces being parallel and arcuate for maintaining total sliding contact between said third and fourth plurality of coacting surfaces respectively along the entire overlapping length thereof as said third and fourth wedge blocks move.

14. An asesmbly as set forth in claim 13 wherein said gear teeth disposed on each of said third and fourth wedge blocks are disposed along respective lines which are parallel to said arcuate surfaces of said third and fourth blocks.

15. An assembly as set forth in claim 14 wherein said second torque means comprises a first straight bar with gear teeth disposed circumferentially thereabout at each end thereof to form said third and fourth gears with one end of said first bar rotatably disposed in one of said lever members and the other end rotatably disposed in the other of said lever members whereby said first bar rotates to move one of said first and second wedge blocks in response to movement of the other by said second drive means.

16. An assembly as set forth in claim 15 wherein said third torque means comprises a second straight bar with gear teeth disposed circumferentially thereabout at each end thereof to form said fifth and sixth gears with one end of said second bar rotatably disposed in one of said lever members and the other end rotatably disposed in the other of said lever members whereby said second bar rotates to move one of said third and fourth wedge blocks in response to movement of the other by said third drive means.

17. An assembly as set forth in claim 16 wherein said first torque means comprises a third straight bar with gear teeth disposed circumferentially thereabout on each end thereof to form said first and second gears with each end of said bar rotatably disposed in said support means whereby said third bar rotates upon movement of said first slider member to move said second slider member.

18. An assembly as set forth in claim 17 wherein said second drive means includes a first gear box connected to one of said lever members, and a first threaded shaft extending therefrom and threadedly engaging a threaded bore in one of said said first and second wedge blocks for moving said one of said first and second wedge blocks.

19. An assembly as set forth in claim 18 wherein said third drive means includes a second gear box connected to one of said lever members, and a second threaded shaft extending therefrom and threadedly engaging a threaded bore in one of said third and fourth wedge blocks for moving said one of said third and fourth wedge blocks.

20. An assembly as set forth in claim 20 wherein said support means includes first and second support members each having a substantially U-shaped cross section with a pair of flanges extending from the legs of each of said U-shaped support members, and a stationary block secured to each of said support members, each of said stationary blocks having a cavity therein and a threaded bore therethrough, each of said slider members slidably disposed in said cavity of one of said blocks by a pair of flanges extending from each of said slider members and slidably disposed in a pair of grooves in each of said stationary blocks, said first drive means including a third gear box connected to said first slider member, and a third threaded shaft extending from said first gear box and threadedly engaging said threaded bore in one of said stationary blocks.

21. An assembly as set forth in claim 20 wherein said third straight bar has one end thereof rotatably disposed in one of said stationary blocks to pass through the cavity thereof and the other end rotatably disposed in the other of said stationary blocks to pass through the cavity thereof whereby each end of said third bar engages one of said slider members.

22. An assembly as set forth in claim 21 wherein said first plurality of coacting surfaces are formed by a first pair of flanges extending from each of said lever members with each of said first pair of flanges slidably disposed in one of a first pair of grooves in each of said first and second wedge blocks, said second plurality of coacting surfaces are formed by said pair of flanges of each of said slider members being disposed in one of a second pair of grooves in each of said first and second wedge blocks, said pair of flanges extending from each of said support members being slidably disposed in one of a third pair of grooves in each of said first and second wedge blocks, said third plurality of coacting surfaces being formed by a second pair of flanges extending from each of said lever members with each of said second pair of flanges slidably disposed in one of a first pair of grooves in each of said third and fourth wedge blocks, said fourth plurality of coacting surfaces formed by a second pair of grooves in each of said third and fourth wedge blocks, and two pair of flanges extending from said mount means with each pair of flanges on said mount means slidably disposed in one of said second pair of grooves in one of said third and fourth wedge blocks, said first pair of flanges and said pair of grooves in each of said first and second wedge blocks being parallel and arcuate, and each of said second pair of flanges on said lever members and each of said first pair of grooves in said third and fourth wedge blocks being parallel and arcuate.

23. An assembly as set forth in claim 1 wherein said motion transmitting means includes gear teeth disposed on each of said first and second wedge blocks, and torque means having a first gear engaging the gear teeth on said first wedge block and a second gear engaging the gear teeth on said second wedge block.

24. An assembly as set forth in claim 23 wherein said torque means comprises a straight bar with gear teeth disposed circumferentially thereabout at least end thereof to form said first and second gears with one end of said bar rotatably disposed in one of said lever members and the other end rotatably disposed on the other of said lever members whereby said bar rotates to move one of said first and second wedge blocks in response to movement of the other by said drive means.

25. An assembly as set forth in claim 24 including a first plurality of relatively slidable coacting surfaces disposed between said lever members and each wedge block, and a second plurality of relatively slidable coacting surfaces disposed between each wedge block and said first and second members, said first plurality of coacting surfaces being disposed at an acute angle with said second plurality of coacting surfaces, one of said first and second plurality of coacting surfaces being parallel and arcuate for maintaining total sliding contact between said coacting surfaces along the entire overlapping length thereof as said wedge blocks move.

26. An assembly as set forth in claim 25 wherein said gear teeth disposed on said first and second wedge blocks are disposed along respective lines which are parallel to said arcuate surfaces.

References Cited

UNITED STATES PATENTS

| | | | |
|---|---|---|---|
| 2,174,636 | 10/1939 | McGregor | 248—394 |
| 3,124,332 | 3/1964 | Heyl | 248—420 |
| 3,319,921 | 5/1967 | Nichols | 248—394 |

FRANCIS K. ZUGEL, *Primary Examiner.*

U.S. Cl. X.R.

248—420, 422